US008437903B2

(12) United States Patent
Willard

(10) Patent No.: US 8,437,903 B2
(45) Date of Patent: May 7, 2013

(54) VEHICULAR DIAGNOSTIC SYSTEM

(75) Inventor: Alexander Willard, Burnham-on-Crouch (GB)

(73) Assignee: Lysanda Limited, Kelvedon, Essex (GB)

(*) Notice: Subject to any disclaimer, the term of this patent is extended or adjusted under 35 U.S.C. 154(b) by 384 days.

(21) Appl. No.: 11/285,227

(22) Filed: Nov. 22, 2005

(65) Prior Publication Data

US 2006/0116811 A1 Jun. 1, 2006

(51) Int. Cl.
*G01M 17/00* (2006.01)

(52) U.S. Cl.
USPC ........... 701/29.1; 701/29.3; 701/24; 701/104; 701/102; 701/33.1; 701/123; 701/115; 340/438; 340/439; 340/442; 340/450; 340/450.2

(58) Field of Classification Search .................... 701/33, 701/29, 117.2, 109, 103; 340/438, 439, 442, 340/450, 450.2
See application file for complete search history.

(56) References Cited

U.S. PATENT DOCUMENTS

| | | | | |
|---|---|---|---|---|
| 4,175,427 | A | 11/1979 | Blanke | |
| 5,431,042 | A | 7/1995 | Lambert et al. | 73/116 |
| 5,583,765 | A * | 12/1996 | Kleehammer | 701/1 |
| 5,589,629 | A * | 12/1996 | Quinn | 73/23.31 |
| 5,750,886 | A | 5/1998 | Lambert et al. | 73/117.3 |
| 5,941,918 | A | 8/1999 | Blosser | |
| 6,230,694 | B1 * | 5/2001 | Cook et al. | 123/568.11 |
| 6,295,492 | B1 | 9/2001 | Lang et al. | |
| 6,308,130 | B1 * | 10/2001 | Vojtisek-Lom | 701/114 |
| 6,435,019 | B1 * | 8/2002 | Vojtisek-Lom | 73/114.69 |
| 6,594,579 | B1 * | 7/2003 | Lowrey et al. | 701/123 |
| 6,595,043 | B2 * | 7/2003 | Jaye | 73/114.06 |
| 6,604,033 | B1 * | 8/2003 | Banet et al. | 701/33.2 |
| 6,941,750 | B2 * | 9/2005 | Boretto et al. | 60/297 |
| 7,069,126 | B2 * | 6/2006 | Bernard | 701/33.2 |
| 7,263,433 | B2 * | 8/2007 | Surnilla et al. | 701/114 |
| 2003/0093217 | A1 * | 5/2003 | Petzold et al. | 701/201 |
| 2003/0136177 | A1 * | 7/2003 | Hendren et al. | 73/23.31 |
| 2006/0116811 | A1 * | 6/2006 | Willard | 701/109 |

FOREIGN PATENT DOCUMENTS

| | | |
|---|---|---|
| EP | 0671617 | 9/1995 |
| EP | 0816820 | 1/1998 |
| EP | 1069422 | 1/2001 |
| GB | 2209854 A * | 5/1989 |
| GB | 2327511 | 1/1999 |
| GB | 2395565 | 5/2004 |
| WO | WO99/06681 | 2/1999 |
| WO | WO01/55690 | 8/2001 |
| WO | WO03/058188 | 7/2003 |

OTHER PUBLICATIONS

European Patent Office Search Report for Application No. GB0425964.4.

European Patent Office Search Report for Application No. GB0510355.1.

* cited by examiner

*Primary Examiner* — Redhwan K Mawari
(74) *Attorney, Agent, or Firm* — Crawfod Maunu PLLC

(57) ABSTRACT

An onboard system for determining vehicle emissions. The emissions are determined in real-time and may be transmitted to a remote terminal for storage and/or analysis. Data is supplied solely to an emissions unit from a vehicle diagnostic system; the vehicle diagnostic system receives vehicle data from vehicle systems and sub-systems.

25 Claims, 5 Drawing Sheets

VEHICULAR DIAGNOSTIC SYSTEM

BACKGROUND OF THE INVENTION

The present invention relates to systems for determining the emissions of a vehicle engine, and in particular to onboard systems for real time determination of engine emissions.

It is well known that vehicle exhaust gases are a cause of environmental pollution. The gaseous pollutants are commonly subdivided Into 4 broad categories: Hydrocarbons (HC), Oxides of Nitrogen (NOx), Carbon Monoxide (CO) and Carbon Dioxide (CO2). Additionally, the exhaust gases comprise very small particulates (referred to as PM10s) of solid matter which have a significant effect on air quality. In North America and Europe legislation provides limits for the mass of each type of pollutant that is emitted when the vehicle is driven over a standard drive-cycle. The standard drive cycle is intended to be broadly representative of how vehicles are actually used (see for example, the Urban Dynamometer Driving Cycle from US Federal Test Procedure 72).

The emissions testing procedure cannot be expected to characterise a vehicle's emissions under all conceivable driving conditions. The standard drive cycles have been designed to be as representative as possible whilst still being a viable basis for an emissions test. Specific legislation exists in both North America and Europe to prohibit manufacturers from calibrating their engine control systems so that a significant increase in tailpipe emissions occurs when the vehicle is operating at speeds and loads not on the standard drive-cycle. This may be desirable as increased performance can be obtained from the vehicle if emissions are deliberately degraded.

The manufacturers are allowed to degrade a vehicle's emissions in order to protect the engine or emission control equipment fitted to the engine and a specific example of this is high load enrichment on spark-ignition (SI) engines. The speeds and accelerations required by this test are easily achievable by a modern vehicle and at no point does the engine get close to full load. At full load, depending on calibration, the SI engine can be operating at an air-fuel ratio that is richer than the stoichiometric ratio (normally to protect the exhaust valves). When the engine is running rich, catalyst conversion efficiency is dramatically reduced and HC and CO emissions increase considerably. Additionally, there are defined windows for each gear change on the drive-cycle that last about two seconds. In practise a gear change can be performed quicker than this. Gear changes, especially fast ones, normally result in the engine being unable to control accurately the air-fuel ratio during these rapid transients. Inaccurate control of the air-fuel ratio results in poor catalyst conversion and consequently increased emissions of HC, NOx and CO.

FIG. 1 shows a graphical depiction of the post catalyst pollutant mass of both hydrocarbons (Line A) and NOx (Line B) as the air-fuel ratio (AFR) is varied. For fuel rich AFRs the HC emissions rise sharply and the NOx emissions are low. For fuel lean AFRs, the NOx emissions rise and the HC emissions are low. When there is a stoichiometric AFR then the NOx and HC emissions are equal and at a relatively low level.

Compression-ignition (CI) engines are capable of running at a wide range of air-fuel ratios. In a CI engine, the air-fuel ratio is varied in order to vary the torque output of an engine. SI engines use a throttle to restrict the mass of air inducted into the engine to achieve the same torque reduction effect. The emissions of HC, NOx and CO are related to the air-fuel ratio and injection timing being used for a CI engine. Richer mixtures tend to result in lower temperature and incomplete combustion, resulting in increased HC and CO emissions.

Injection timing also has an effect on the level of emissions. A CI engine has an optimum injection angle for efficiency, although emissions considerations may force the controller to deviate from the optimum. Injection timing affects the peak temperature achieved during combustion. At high combustion temperatures, atmospheric nitrogen is fixated and NOx emissions arise. Other factors, such as instantaneous catalyst conversion efficiency, the use of exhaust gas recirculation (EGR), time since start and particulate trap state also affect tailpipe emissions on SI and or CI engines. Considering this range of factors, it can be seen that there are many modes of driving which generate more pollutants than the figures predicted by standard drive cycles.

Further to the standards for vehicle emissions over a defined drive cycle, the engine control system on a vehicle must also monitor the performance of emissions control equipment. If a fault is detected in the emissions control equipment that could result in an increase in tailpipe emissions, the engine controller warns the driver by illuminating a "check engine" lamp on the instrument cluster. This lamp is referred to as the "malfunction indicator lamp" and the driver is expected to take the vehicle for service if the lamp becomes illuminated. In order to detect these faults, the engine controller contains a suite of diagnostics (OBD) software that monitors engine performance. The OBD standard also specifies a protocol that allows proprietary software tools to interrogate the engine controller. This interface allows access to fault codes that are stored inside the engine controller. OBD must also support the reporting of real-time measurements made by the engine controller, such as engine speed, calculated load, etc.

As part of the homologation process for a new vehicle, it will be subjected to an emissions test, during which a driver will be required to control the vehicle's speed to a set point as determined by the drive cycle. Exhaust gases from the vehicle are stored in a bag which is subdivided into a number cells, which allows a small gas sample to be collected once a second on the drive cycle. At the end of the test, the gas samples are analysed to determine the mass of HC, $NO_x$, CO and $CO_2$ in each sample. The equipment used to perform the gas analysis is bulky (usually one wall of a large room) and this technology is not suitable for on-vehicle processing of emissions.

Alternative measurement techniques are now available: Fast $NO_x$ and HC sensors have been developed (for example by Cambustion in the UK) and allow instantaneous measurement of pollutant mass. This equipment is expensive and still relies on bottled reference gases, rendering this technology unsuitable for use for on-vehicle emissions testing. Fast $NO_x$ sensors, suitable for on-vehicle use, are in development for advanced Diesel emissions control systems but this technology is not yet mature. An equivalent HC sensor is not currently available and the cost of retrofitting these sensors to a vehicle and interfacing them to the emissions control systems will still be high.

A known technique is disclosed by U.S. Pat. No. 6,604,033, in which a system is provided that uses exhaust gas sensors and data provided by an onboard diagnostic system to determine the emissions of a vehicle and whether or not they meet a regulatory threshold. The most significant disadvantage of the system disclosed in U.S. Pat. No. 6,604,033 is that the exhaust gas sensors are expensive and will need to be installed to each vehicle for which the emissions are to be measured.

SUMMARY OF THE INVENTION

According to the present invention there is provided an apparatus for measuring the emissions produced by a vehicle, the apparatus comprising: an emissions unit, a vehicle diagnostic system, and one or more vehicle systems, wherein: the vehicle diagnostic system being in direct communication with the one or more vehicle systems and, in use, receiving vehicle data from the one or more vehicle systems; the emissions unit, in use, receiving diagnostic data solely from the vehicle diagnostic system; and the system, in use, determines the emissions produced by a vehicle using the diagnostic data received by the emissions unit.

The advantage of the present invention is that the vehicle emissions can be determined without needing to access any of the vehicle's systems and only requires access to the diagnostic system of the vehicle. This provides an apparatus that enables the vehicle emissions to be determined and that is cheaper to install, cheaper to operate and more reliable than the system disclosed in U.S. Pat. No. 6,604,033.

BRIEF DESCRIPTION OF THE DRAWINGS

The invention will now be described, by way of example only, with reference to the following Figures in which.

DESCRIPTION OF THE PREFERRED EMBODIMENTS

Figure 1:
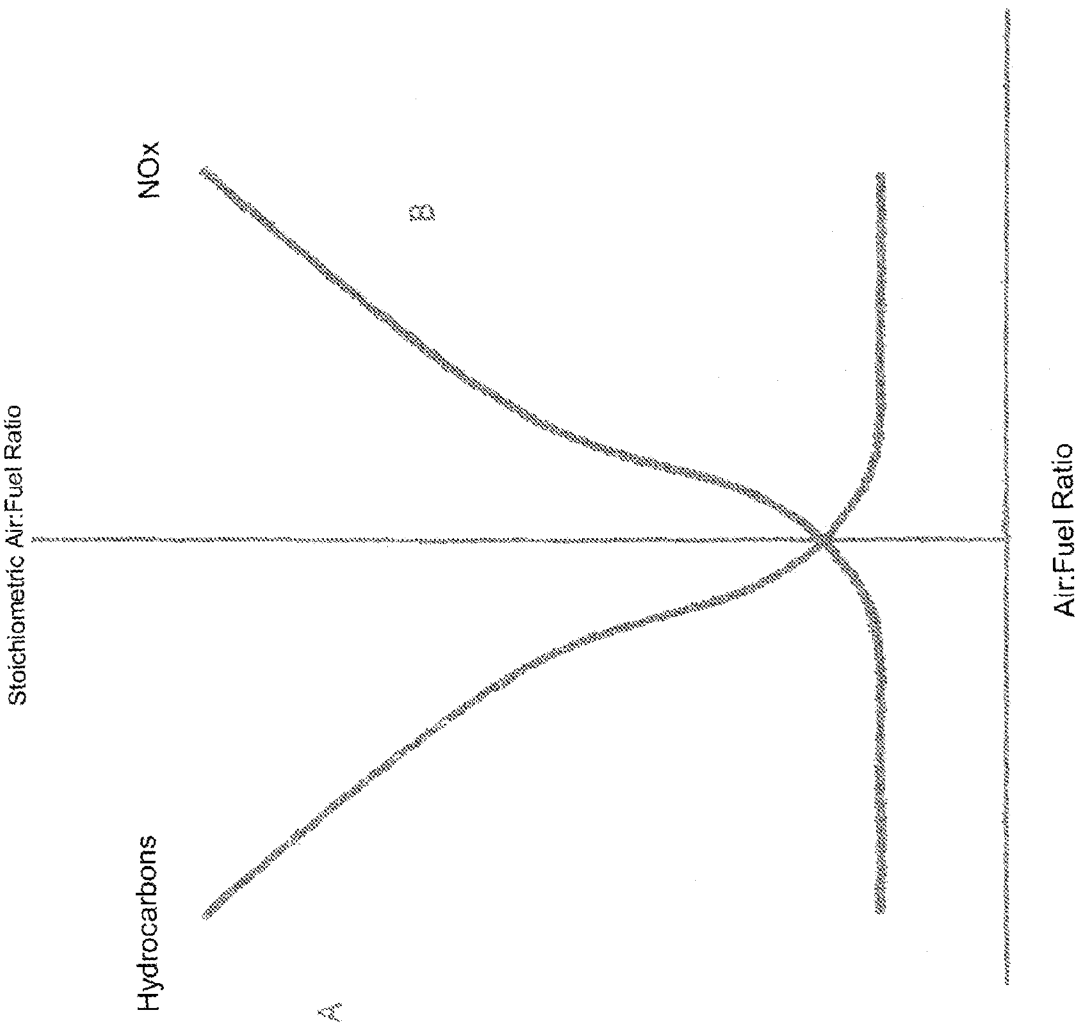
FIG. 1 shows a first view of a graphical depiction of the post catalyst pollutant mass of both hydrocarbons and NOx as the air-fuel ratio is varied.
Figure 2:
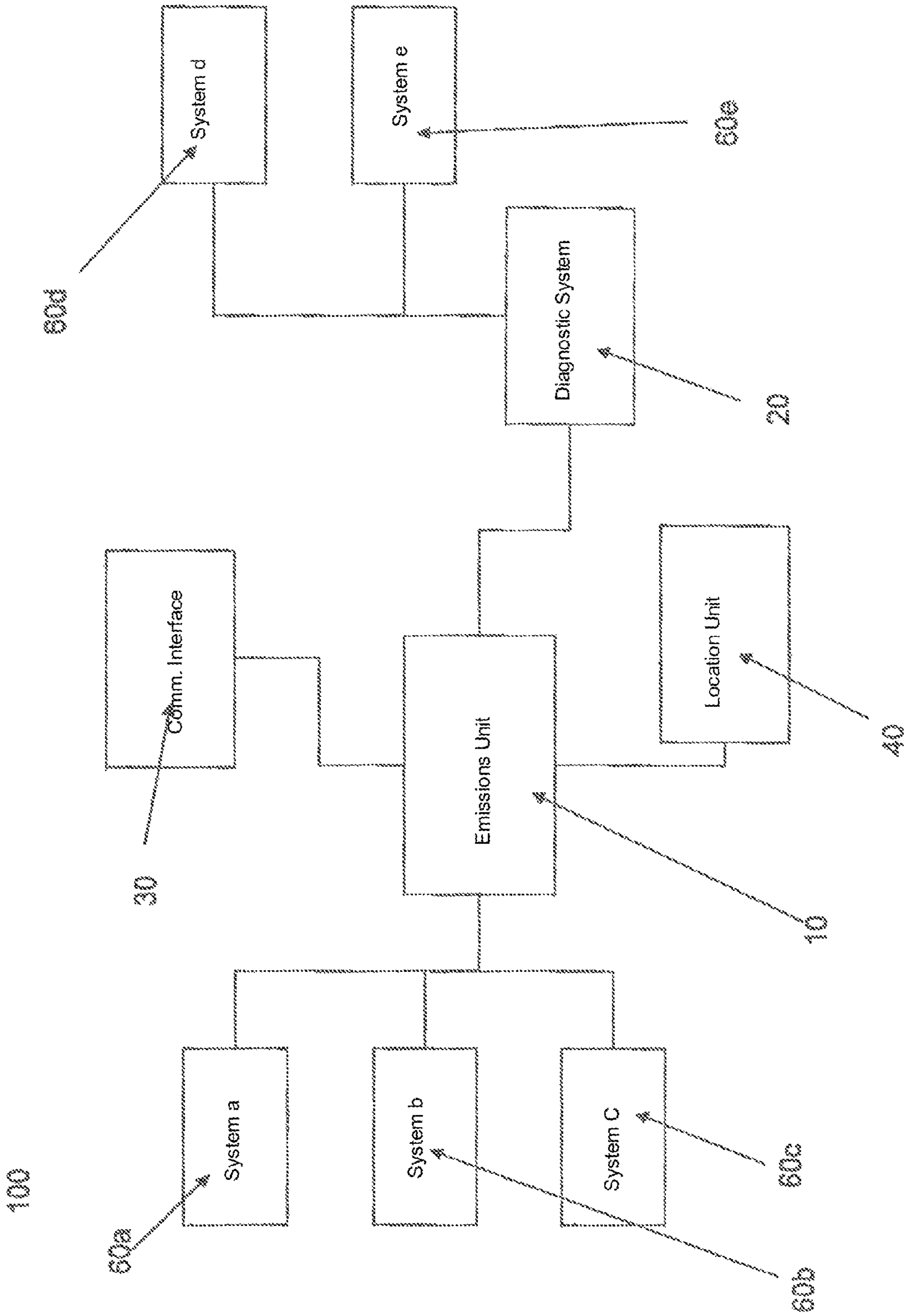
FIG. 2 shows a schematic depiction of a system according to the present invention under calibration.

FIG. 2 shows a schematic depiction of a system 100 according to the present invention under calibration. The system comprises emissions unit 10, vehicle diagnostic system 20, communications interface 30, vehicle location unit 40 and a plurality of vehicle systems and sub-systems 60*a*, 60*b*, . . . ,. The emissions unit 10 is connected to the vehicle diagnostic system, which may be for example, the OBD or OBD-II system. The emissions unit 10 is also connected directly to a plurality of vehicle systems and sub-systems, for example to monitor the engine temperature. This enables additional data to be measured which can not be received directly from the vehicle diagnostic system or to provide a check against the data being provided by the vehicle diagnostic system. The emissions unit is also connected to the communications interface 30 and the vehicle location unit 40 (see below).

When under calibration, the vehicle emissions are measured using conventional methods across a wide range of engine speeds and loads, environmental conditions, etc, and the data received from the vehicle diagnostic system and directly from the plurality of vehicle systems and sub-systems is also recorded. These data sets can then be correlated so that in use, the vehicle emissions can be determined solely on the basis of the data received from the vehicle diagnostic system.

Figure 3:
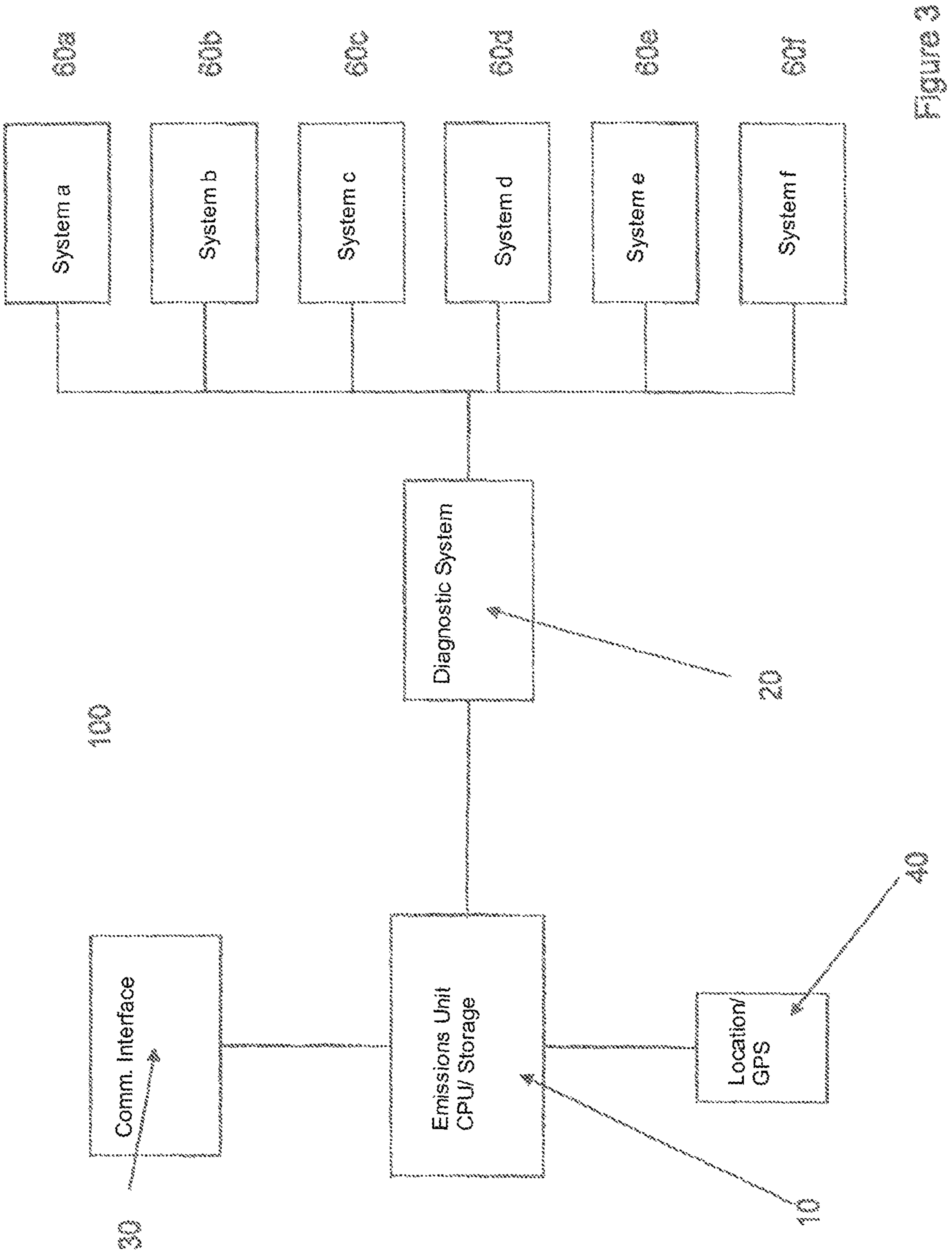
FIG. 3 shows a schematic depiction of a system according to the present invention in use within a vehicle.

FIG. 3 shows a schematic depiction of a system according to the present invention in use within a vehicle. The system comprises emissions unit 10, vehicle diagnostic system 20, communications interface 30, vehicle location unit 40 and a plurality of vehicle systems and sub-systems 60*a*, 60*b*, . . . ,. In use the system is configured differently to the system disclosed in FIG. 2 in that the emissions unit 10 has a direct connection to the vehicle diagnostic system 20 which is in turn connected to the of vehicle systems and sub-systems 60*a*, 60*b*, . . . ,. There is no connection between the emissions unit 10 and the vehicle systems and sub-systems 60*a*, 60*b*, . . . ,.

In use, the emissions unit receives data solely from the vehicle diagnostic system and the vehicle emissions can be determined by the emissions unit in accordance with the data received from the vehicle diagnostic system. The vehicle emissions may be directly calculated based on the data received from the vehicle diagnostic system, one or more inferences of a vehicle state or parameter may be made based on the received data and the vehicle emissions determined based on the inferences and/or one or more data values, or the emissions value(s) may be determined from accessing a look-up table. The emissions unit comprises a processing unit, such as a CPU, that interprets the data received by the emissions unit from the vehicle diagnostic system and determines the vehicle emissions. The emissions unit further comprises data storage means, and preferably both volatile and non-volatile data storage means, for storing data received from the vehicle diagnostic system and determined vehicle emissions values.

The emissions unit is also connected to a vehicle location unit 40, which may be a GPS receiver or a mobile phone receiver, that determines the position of the vehicle. The position data can be fed to the emissions unit and used to correlate data received from the vehicle diagnostic system, for example validating the speed or distance travelled by the vehicle. The communications interface 30 may be used by the emissions unit to transfer emissions data and/or the parameters used to determine the emissions data. The data can be downloaded to a remote terminal that analyses the emissions data, driving style of the driver, routes travelled, etc. such that the usage of the vehicle can be monitored and appropriate feedback passed on to the driver. The communications interface may be a mobile telephone interface, for example using GSM, GPRS or 3G technologies to transmit the data. Other suitable communication technologies may be alternatively or additionally used.

Figure 4:
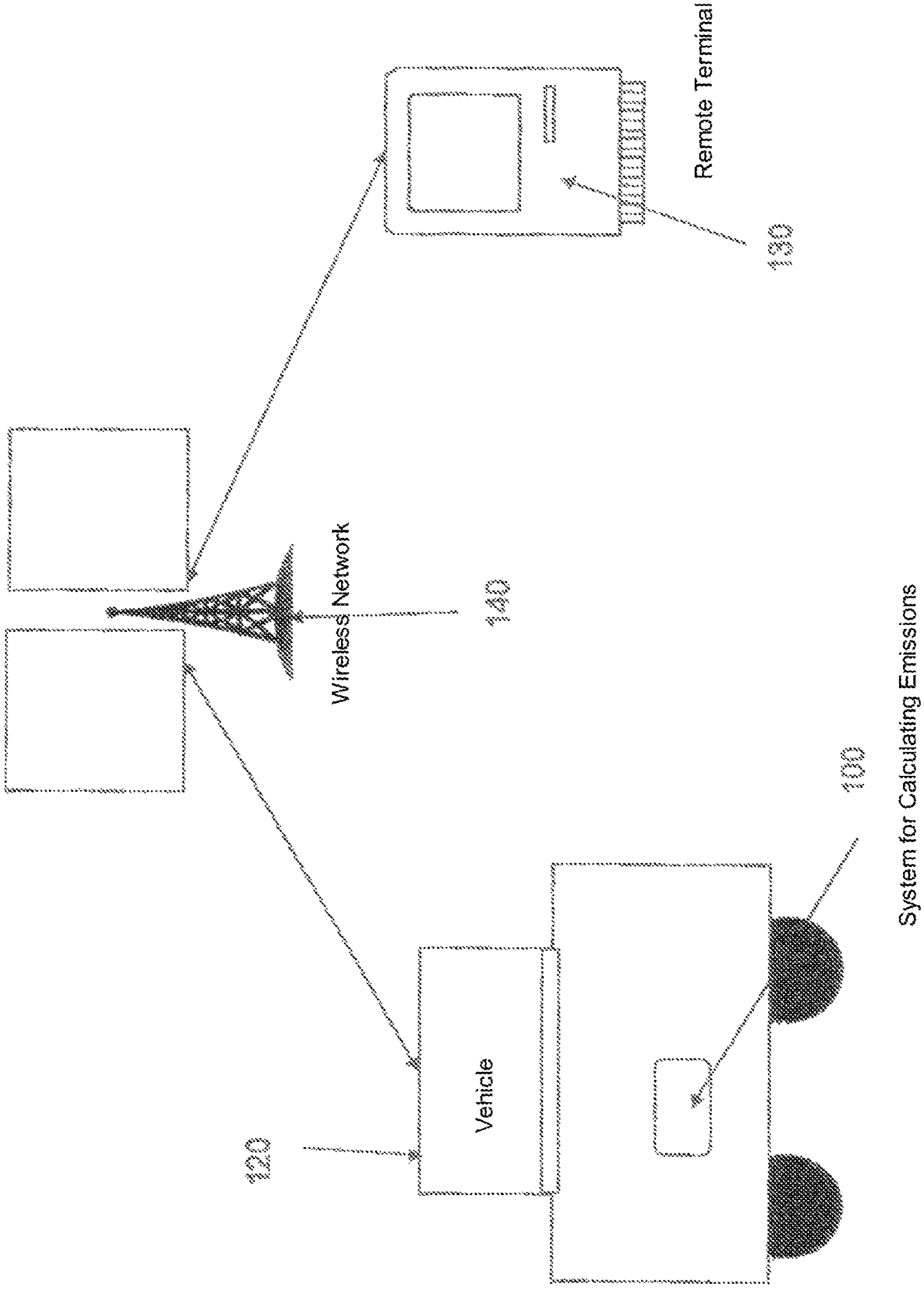
FIG. 4 shows a schematic depiction of an a alternative embodiment of the present invention.

FIG. 4 shows a schematic depiction of an alternative embodiment of the present invention. Vehicle 120 comprises a system 100 according to the present invention, substantially as described above with reference to FIG. 3. The system 100 further comprises a remote terminal 130 which is in communication with emissions unit 10 via the communications interface 30 and wireless communications network 140. In this alternative embodiment, some or all of the determination of the vehicle emissions is performed by the remote terminal; for example the emissions unit may send the data received from the vehicle diagnostic system directly to the remote terminal for the remote terminal to determine the vehicle emissions. Alternatively, the emissions unit 10 may perform some of the processing required to determine the vehicle emissions and then pass the data to the remote terminal to perform the rest of the data processing. The remote terminal may also store the vehicle emissions for subsequent analysis, along with the driving style of the driver, routes travelled, etc. such that the usage of the vehicle can be monitored and appropriate feedback passed on to the driver. The emissions unit 10 may store a data set in the data storage means and then the data set transmitted to the terminal at an appropriate interval. Alternatively, data may be transmitted to the remote terminal when it is received by the emissions unit.

The wireless communications network may be a mobile telephone network, for example using GSM, GPRS or 3G technologies to transmit the data. It will be understood that the remote terminal may be connected to the wireless network via one or more fixed networks. The remote terminal is stationary and located external to the vehicle but the term 'remote' need not mean that the terminal is a long distance from the vehicle. For example, the remote terminal may be sited in a garage or workshop and a Bluetooth (RTM) or WiFi (RTM) network used to provide the wireless communication between the system and the terminal. It will be readily understood that other suitable communication technologies may be alternatively or additionally used.

Vehicle manufacturers go to considerable effort to calibrate the onboard diagnostics software inside the engine controller and thus the control software implemented inside a controller is a very accurate model of engine performance. Thus the present invention uses data obtained from OBD for the determination of the vehicle emissions. If additional information is required then it will be necessary to add sensors to vehicle components or systems or to extract signals from one or more vehicle systems or the wiring loom of the vehicle. This will lead to an increase in cost and complexity for the system.

The vehicle diagnostic system can report data for a number of different vehicle parameters, such as, for example, vehicle speed, engine speed, throttle angle, engine temperature, etc. Further information regarding the OBD system and its capabilities can be found at http://www.epa.gov/otaq/obd.htm. The emissions unit may receive data from, for example, a temperature sensor measuring the temperature of a catalytic converter (for spark ignition engines, see below), powertrain components, ignition systems etc. It will be readily understood that the sophistication and complexity of the model used to determine vehicle emissions will in part be determined by the type and number of parameters that are used as inputs to the model.

Spark Ignition Engines

Determining the emissions from SI engines relies on a set of key parameters being known or estimated. Wherever possible an engine controller will operate an SI engine at a stoichiometric air-fuel ratio (AFR) under closed loop control. The OBD interface reports whether fuelling is currently closed or open loop, but a report of the actual AFR is not guaranteed by the OBD standard. In the event that a particular implementation of the OBD standard does not include a report of the actual AFR then an estimation or inference of the ratio must be made. Tables 1 & 2 below show some of the factors that will be used to determine an open loop AFR:

TABLE 1

| Reasons for a rich AFR | Primary measurement method |
|---|---|
| Warm-up | Estimate using coolant temperature from OBD port |
| Catalyst/engine protection | Estimate using engine load from the OBD port and measured data from a reference vehicle. |
| Driveability | Estimate from engine load and data from a calibration exercise |
| Exit from over-run fuel shutoff | Estimate from engine load, calibration data and the closed loop fuelling flag |
| Fault conditions | Determine from malfunction indication on OBD |
| Aged components | Estimate from durability measurements on the reference vehicle and open loop fuelling flag from OBD |
| Poor transient control | Estimate from load and measurements on the reference vehicle |
| Deliberate perturbation for diagnostics tests | Infer from diagnostics monitor status, reported over the OBD link |

TABLE 2

| Reasons for a lean AFR | Primary measurement method |
|---|---|
| Fast catalyst light-off | Determine from closed loop fuelling flag, time since start and coolant temperature |
| Fault conditions | Determine from malfunction Indication on OBD |
| Aged components | Estimate from durability measurements on the reference vehicle and open loop fuelling flag from OBD |
| Poor transient control | Estimate from load and measurements on the reference vehicle |
| Special operating modes | Examples are over-run fuel shut-off and cylinder cutout for rev or torque limiting |

A modern three-way catalytic converter must have a high temperature in order to convert HC and $NO_x$ into $H_2O$, $CO_2$ and $N_2$ and the conversion efficiency is dependent on a number of factors (see Table 3) below:

TABLE 3

| Reasons for reduced conversion efficiency | Primary measurement method |
|---|---|
| Temperature | Estimate from load (OBD), time since start, engine temperature (OBD), air-fuel ratio (estimated by the model) and ignition advance (OBD). It is believed that this estimation technique may lack the required accuracy and thus it may be necessary to directly measure this parameter |
| AFR history | A catalyst can be regarded as an oxygen storage device. When a large amount of oxygen has been stored in the catalyst, it will be most efficient at HC and CO conversion. When little oxygen is stored in the catalyst, it will be more efficient at $NO_x$ conversion. The history of the estimated AFR will be used to compute conversion efficiency. |
| Catalyst age | A brand new catalyst does not exhibit the same conversion efficiency properties as one that has been fitted to a vehicle that has covered several thousand miles. A new catalyst will have unpredictable oxygen storage properties and measurements across a range of reference vehicles will be used to correlate conversion efficiency with vehicle age. |

Once the conversion efficiency and current AFR are known, the HC, CO and $NO_x$ emissions can be determined.

Compression Ignition Engines

Figure 5:
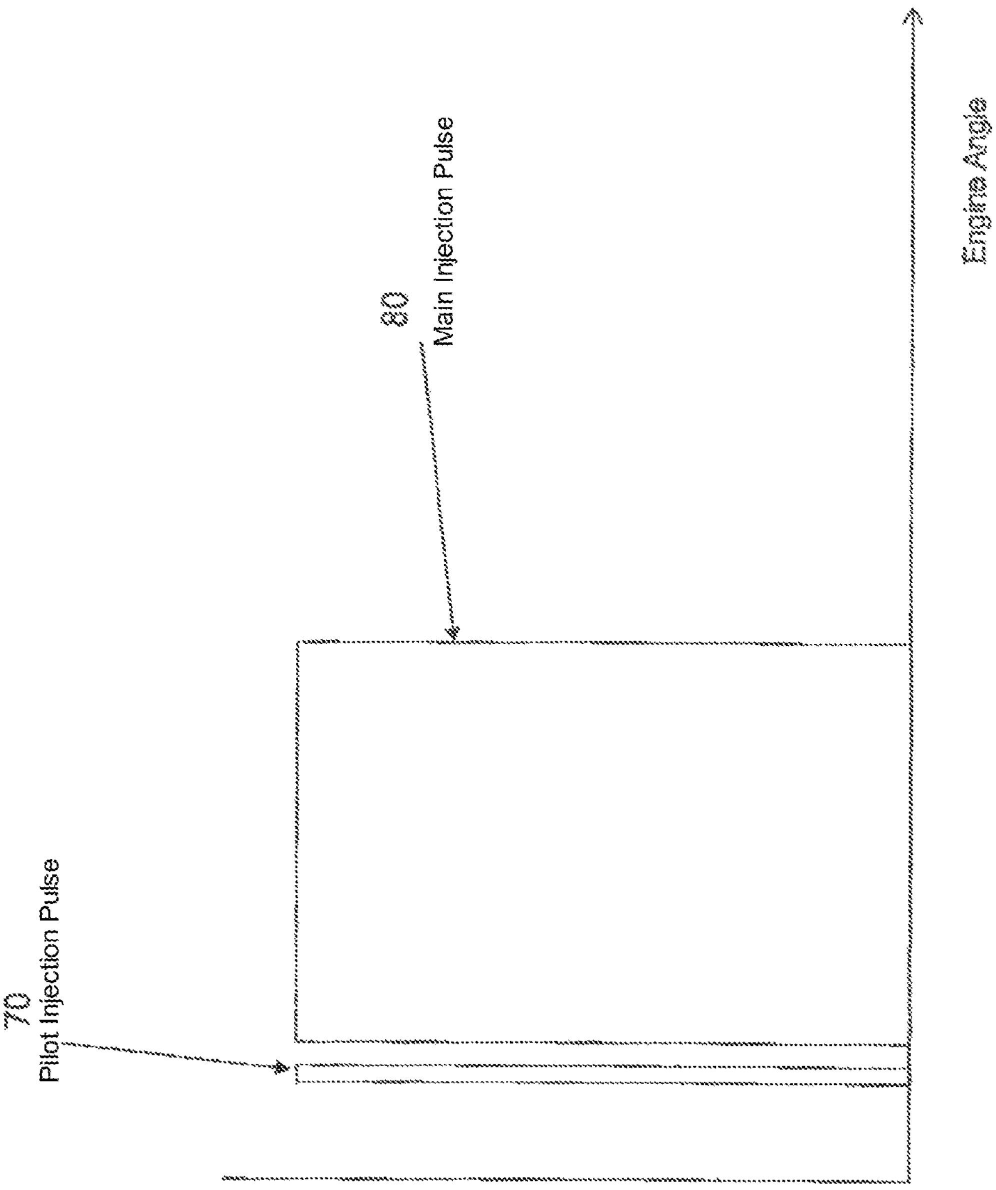
FIG. 5 shows a graphical depiction of the multiple injection pulses used with a modern Diesel engine.

It is anticipated that CI engines will require direct monitoring of the injection pulse sequences and timing to determine accurately the emissions (this monitoring will typically be carried out in addition to the measurement and monitoring steps described above with reference to spark-ignition engines). Detailed injector pulse data is not available over OBD and will therefore have to be directly measured with accurate pulse timing being required if useful emissions data is to be calculated. FIG. 5 shows a graphical depiction of typical Diesel multiple injection pulses as used for with a modern engine. Typically a short duration pilot injection 70 is followed by a main injection 80 having a much greater duration. A software or hardware timer may be used to capture the pulse duration. The measurement of the engine angle at which the pulse occurs requires timing against a pulse from a known reference point on the engine. An electronically controlled CI engine will typically have Hall effect or variable reluctance sensors connected to the engine camshaft and crankshaft. These sensors are used by the CI engine controller to schedule fuel injection and it may be possible to use non-invasive inductive coupling to sense the injector activity. Other sensing techniques which may be used include, without limitation, single- or multiple-axis accelerometers, serial connections, probes and pump sensors.

It is common for modern CI engines to use exhaust gas recirculation (EGR) to reduce $NO_x$ emissions. It is proposed to estimate the amount of EGR being used, although direct measurement may alternatively be performed. Testing can indicate which approach is to be preferred for different vehicle types. Table 4 indicates some factors that influence the amount of EGR commanded by a typical control strategy:

TABLE 4

| Input variable | Primary measurement method |
|---|---|
| Engine load | Available over OBD |
| Engine speed | Available over OBD or direct measurement from injection sensing |
| Engine temperature | Available over OBD |
| Air charge temperature | Available over OBD |
| Inducted air mass | Available over OBD |
| Time since start | Calculated internally by the system |

The models for both spark- and compression-ignition engines will allow an accurate prediction of actual fuel used, independent from any calculations done inside the engine controller. However, vehicle emissions are known to be strongly dependent upon driver performance and thus a number of different driver behaviours can be measured or inferred, such as, for example:

Time spent at or close to full load—minimising full load operation reduces a vehicle's emissions.

Time spent at high loads when the engine is cold—this leads to increased emissions.

Time spent in top gear at light loads—lower gears result in increased fuel usage and emissions for a given mileage.

Time spent with engine running and vehicle stationary.

Number of short journeys.

Thus it is possible to determine what the effect of the driving style an individual driver has on the emissions of their vehicle. This enables driver training to be provided as appropriate.

The rate at which the vehicle emissions are computed needs careful consideration. If it is too slow, transient conditions where high emissions are likely may be missed. As the OBD port provides data-updates fairly slowly (a few samples per second) then there is little value in calculating the emissions value at a significantly greater rate than this. Thus, in the context of the present invention, real-time determination of vehicle emissions may be interpreted to mean that an emissions value is determined at least once a second, and preferably approximately 10 times per second.

It will be readily understood that the present invention may be used with any type of vehicle having an internal combustion engine and also with other Internal combustion engines.

The invention claimed is:

1. In a motor vehicle comprising a diagnostic system having an input and an output, and a plurality of vehicle subsystem sensors connected to the input of the diagnostic system, an apparatus for producing data on at least one of fuel consumption and vehicle emissions during operation of the vehicle, the apparatus comprising an emissions unit disposed on-board the vehicle and having an input connected to the output of the diagnostic system;

a first processing circuit configured and arranged to access stored data including at least one of look-up tables and intuitive models for different types of vehicles, and including a communications interface configured and arranged to obtain vehicle identification data and measured sub-system data from the diagnostic system, and to load data specific to the identified vehicle data from the stored data; and a second processing circuit configured and arranged to, during operation of the vehicle and on-board the vehicle, calculate at least one of fuel consumption data and emissions data in real time using the stored data and the sub-system data obtained from the diagnostic system, and make the calculated data available in the motor vehicle in real time, wherein the first processing circuit is configured and arranged to access the stored data by using the vehicle identification data to identify stored data for one of the different types of vehicles that corresponds to the vehicle identification data, and the second processing circuit is configured and arranged to calculate the at least one of fuel consumption data and emissions data using the identified stored data for the one of the different types of vehicles.

2. The apparatus according to claim 1, wherein the output of the diagnostic system is an OBD/OBD-II port.

3. The apparatus according to claim 1, wherein the emissions unit obtains subsystem data including engine load, engine speed, engine temperature, air change temperature and induced air mass from the diagnostic system, in order to calculate emissions.

4. The apparatus according to claim 3, wherein the emissions unit also obtains the throttle angle from the diagnostic system.

5. The apparatus of claim 1, wherein the emissions unit is arranged for connection to additional sensors for calibration, and the calculated results are used to update the look-up tables or the intuitive model.

6. The apparatus according to claim 1, further comprising a communications interface connected to the emissions unit, the communications interface being configured and arranged to transmit calculated emissions data to a remote computer.

7. The apparatus according to claim 6, further comprises a vehicle location unit.

8. Apparatus for producing at least one of fuel consumption and emissions data on-board a vehicle during operation of the vehicle, the apparatus comprising:

an emissions unit adapted for connection to a vehicle diagnostic system (OBD/OBD-II) port, the emissions unit including a data storage circuit configured and arranged to store data, the stored data including at least one of look-up tables and intuitive models including data relating to different types of vehicles;

a first processing circuit having access to the stored data and including a communications interface configured and arranged to obtain vehicle identification data and measured sub-system data from the diagnostic system, and to load data specific to the identified vehicle data from the data storage circuit; and a second processing circuit configured and arranged to, during operation of the vehicle and on-board the vehicle, calculate at least one of fuel consumption data and emissions data in real time using the stored data and the sub-system data obtained from the diagnostic system, and make the data available at the vehicle in real time, wherein the first processing circuit has access to the stored data by using the vehicle identification data to identify stored data for one of the different types of vehicles that corresponds to the vehicle identification data, and the second processing circuit is configured and arranged to calculate the at least one of fuel consumption data and emissions data using the identified stored data for the one of the different types of vehicles.

9. The apparatus according to claim 8, wherein the emissions unit obtains subsystem data including engine load, engine speed, engine temperature, air change temperature and induced air mass from the diagnostic system, in order to calculate emissions.

10. The apparatus according to claim 8, wherein the emissions unit also obtains the throttle angle from the diagnostic system.

11. The apparatus of claim 8, wherein the emissions unit is arranged for connection to additional sensors for calibration, and the calculated results are used to update the look-up tables or the intuitive models.

12. The apparatus according to claim 8, further comprising a communications interface connected to the emissions unit, and a remote computer, the communications interface providing a connection to the remote computer for transmission of calculated emissions data to the remote computer.

13. The apparatus according to claim 8, further comprising a vehicle location unit.

14. The apparatus according to claim 1, wherein the emissions data includes data on at least one of HC, CO and $NO_x$ emissions.

15. The apparatus according to claim 1, wherein the second processing circuit is further configured and arranged for performing calculations at a rate of at least one per second.

16. The apparatus according to claim 8, wherein the emissions data includes data on at least one of HC, CO and $NO_x$-emissions.

17. The apparatus according to claim 8, wherein the second processing circuit is further configured and arranged for performing calculations at a rate of at least one per second.

18. The apparatus according to claim 1, wherein the emissions unit is further configured and arranged to communicate with a remote terminal configured and arranged for calculating an effect of driving style on emissions.

19. The apparatus according to claim 8, wherein the emissions unit is further configured and arranged to communicate with a remote terminal configured and arranged for calculating an effect of driving style on emissions.

20. The apparatus according to claim 1, wherein the emissions unit is configured and arranged to perform a portion of the emissions data calculation and communicate with a remote terminal configured and arranged to perform the remaining portion of the emissions data calculation.

21. The apparatus according to claim 8, wherein the emissions unit is configured and arranged to perform a portion of the emissions data calculation and communicate with a remote terminal configured and arranged to perform the remaining portion of the emissions data calculation.

22. The apparatus according to claim 1, wherein the emissions unit is further configured and arranged to communicate with a remote terminal configured and arranged to calculate the emissions data, driving style of the driver, and routes traveled.

23. The apparatus according to claim 8, wherein the emissions unit is further configured and arranged to communicate with a remote terminal configured and arranged to calculate the emissions data, driving style of the driver, and routes traveled.

24. The apparatus of claim 1, wherein the first processing circuit is configured and arranged to access stored data by using the vehicle identification data to identify stored data for one of the different types of vehicles that corresponds to the vehicle identification data, and the second processing circuit is configured and arranged to calculate the at least one of fuel consumption data and emissions data using the identified stored data for the one of the different types of vehicles to ascertain information presented from the vehicle sub-system sensors to the input of the diagnostic system.

25. The apparatus of claim 8, wherein the first processing circuit is configured and arranged to access stored data by using the vehicle identification data to identify stored data for one of the different types of vehicles that corresponds to the vehicle identification data, and the second processing circuit is configured and arranged to calculate the at least one of fuel consumption data and emissions data using the identified stored data for the one of the different types of vehicles to ascertain information presented in the vehicle sub-system data.

* * * * *